T 858,007

BEST AVAILABLE COPY

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JANUARY 7, 1969

858 O.G. 42

676,723

POLYESTERS OF ALKYL-SUBSTITUTED 1,3-CYCLOBUTANEDIMETHANOLS

Edward U. Elam and Sarah Joelle Rush, both of P.O. Box 511, Kingsport, Tenn. 37662

Filed Oct. 20, 1967. Published Jan. 7, 1969

Class 260—75

No Drawing. 11 Pages Specification

High melting, linear polyesters are prepared from a dicarboxylic acid and an alkyl-substituted 1,3-cyclobutanedimethanol. These polyesters are valuable for the production of fibers, films, and molded objects.